United States Patent
Schumacher

(10) Patent No.: US 11,699,312 B2
(45) Date of Patent: Jul. 11, 2023

(54) VEHICLE RECORDING SYSTEM UTILIZING EVENT DETECTION

(71) Applicant: Stoneridge Electronics, AB, Solna (SE)

(72) Inventor: Darren Schumacher, Ann Arbor, MI (US)

(73) Assignee: Stoneridge Electronics, AB, Solna (SE)

( * ) Notice: Subject to any disclaimer, the term of this patent is extended or adjusted under 35 U.S.C. 154(b) by 376 days.

(21) Appl. No.: 16/864,535

(22) Filed: May 1, 2020

(65) Prior Publication Data

US 2020/0349779 A1  Nov. 5, 2020

Related U.S. Application Data

(60) Provisional application No. 62/842,560, filed on May 3, 2019.

(51) Int. Cl.
  *B60W 30/095* (2012.01)
  *G06N 3/08* (2023.01)
  *G07C 5/08* (2006.01)

(52) U.S. Cl.
  CPC ......... *G07C 5/085* (2013.01); *B60W 30/0956* (2013.01); *G06N 3/08* (2013.01); *G07C 5/0808* (2013.01)

(58) Field of Classification Search
  CPC ...... G07C 5/085; G07C 5/0808; G07C 5/008; G07C 5/0866; B60W 30/0956; G06N 3/08
  See application file for complete search history.

(56) References Cited

U.S. PATENT DOCUMENTS

| | | | |
|---|---|---|---|
| 5,430,432 A | * | 7/1995 | Camhi ............... G07C 5/0825 702/41 |
| 5,815,092 A | | 9/1998 | Kikinis |
| 5,815,093 A | | 9/1998 | Kikinis |

(Continued)

OTHER PUBLICATIONS

International Preliminary Report on Patentability for International Patent Application No. PCT/US2020/030992 dated Nov. 18, 2021.

(Continued)

*Primary Examiner* — Peter D Nolan
*Assistant Examiner* — Anwar Mohamed
(74) *Attorney, Agent, or Firm* — Carlson, Gaskey & Olds, P.C.

(57) ABSTRACT

A recording system for a vehicle according to an example of the present disclosure includes proximity sensors configured to obtain data indicative of a distance between a vehicle and external objects and at least one vehicle operation sensor configured to obtain data indicative of how a driver is operating the vehicle. A controller is configured to obtain input data for a current monitoring period that includes data from the plurality of proximity sensors and the at least one vehicle operation sensor; utilize a predictive engine to determine whether the input data fulfills a criteria set corresponding to a potential impending vehicle incident; based on the input data fulfilling the criteria set commence saving of the input data from the current monitoring period and subsequent monitoring periods in a data set; and based on the input data not fulfilling the criteria set delete the input data for the current monitoring period.

21 Claims, 5 Drawing Sheets

(56) References Cited

U.S. PATENT DOCUMENTS

| | | | |
|---|---|---|---|
| 7,355,628 B2 | 4/2008 | Matko et al. | |
| 7,804,426 B2 | 9/2010 | Etcheson | |
| 8,466,781 B2* | 6/2013 | Miller | G06F 17/00 |
| | | | 340/576 |
| 8,553,131 B2 | 10/2013 | Tseng et al. | |
| 8,823,799 B2 | 9/2014 | Kuehnle et al. | |
| 9,058,524 B2 | 6/2015 | Kuehnle | |
| 9,227,563 B2 | 1/2016 | Hamdan et al. | |
| 9,286,695 B2 | 3/2016 | Kuehnle et al. | |
| 9,437,055 B2 | 9/2016 | Kuehnle et al. | |
| 9,600,266 B2 | 3/2017 | Molin et al. | |
| 9,674,414 B1 | 6/2017 | Molin et al. | |
| 9,701,307 B1* | 7/2017 | Newman | B60W 10/04 |
| 9,718,405 B1* | 8/2017 | Englander | G01S 19/13 |
| 9,860,445 B2 | 1/2018 | Kuehnle et al. | |
| 9,902,322 B2 | 2/2018 | Kuehnle et al. | |
| 9,908,470 B1* | 3/2018 | Englander | G01S 19/13 |
| 9,922,567 B2 | 3/2018 | Molin et al. | |
| 9,924,085 B2 | 3/2018 | Intagliata | |
| 9,925,987 B1 | 3/2018 | Nguyen | |
| 9,990,550 B2 | 6/2018 | Kuehnle et al. | |
| 9,996,756 B2 | 6/2018 | Hoye et al. | |
| 10,055,643 B2 | 8/2018 | Molin et al. | |
| 10,067,897 B1 | 9/2018 | Lesher et al. | |
| 10,073,464 B2 | 9/2018 | Pilkington | |
| 10,081,308 B2 | 9/2018 | Kuehnle et al. | |
| 10,166,934 B2 | 1/2019 | Nemat-Nasser et al. | |
| 10,796,510 B2* | 10/2020 | Walker | H04N 9/79 |
| 10,991,242 B2* | 4/2021 | Taylor | H04Q 9/00 |
| 11,069,257 B2* | 7/2021 | Palmer | G09B 5/02 |
| 2003/0154009 A1* | 8/2003 | Basir | G07C 5/0866 |
| | | | 348/148 |
| 2004/0164852 A1* | 8/2004 | Li | G01S 13/931 |
| | | | 340/435 |
| 2007/0132773 A1 | 6/2007 | Plante | |
| 2010/0138094 A1 | 6/2010 | Stark et al. | |
| 2015/0109450 A1* | 4/2015 | Walker | H04N 9/79 |
| | | | 348/148 |
| 2016/0140872 A1* | 5/2016 | Palmer | G06V 20/40 |
| | | | 434/65 |
| 2016/0224476 A1 | 8/2016 | Pandy et al. | |
| 2016/0236638 A1* | 8/2016 | Lavie | G08G 1/205 |
| 2017/0277961 A1 | 9/2017 | Kuehnle | |
| 2018/0007323 A1 | 1/2018 | Botusescu et al. | |
| 2018/0139384 A1 | 5/2018 | Li et al. | |
| 2018/0157270 A1 | 6/2018 | Kasper et al. | |
| 2018/0188725 A1 | 7/2018 | Cremona et al. | |
| 2018/0188746 A1 | 7/2018 | Lesher et al. | |
| 2018/0190119 A1 | 7/2018 | Miller, Jr. et al. | |
| 2018/0273051 A1 | 9/2018 | Amato et al. | |
| 2018/0299284 A1* | 10/2018 | Wang | G01C 21/3694 |
| 2018/0334167 A1 | 11/2018 | Drown et al. | |
| 2020/0286378 A1* | 9/2020 | Wang | G08G 1/0129 |
| 2020/0401820 A1* | 12/2020 | Nagata | G06V 20/597 |

OTHER PUBLICATIONS

International Search Report and Written Opinion for International Application No. PCT/US2020/030992 dated Jul. 22, 2020.

* cited by examiner

VEHICLE RECORDING SYSTEM UTILIZING EVENT DETECTION

CROSS-REFERENCE TO RELATED APPLICATIONS

This application claims the benefit of U.S. Provisional Application No. 62/842,560, filed May 3, 2019, which is incorporated herein by reference in its entirety.

BACKGROUND

This application relates to vehicle monitoring, and more particularly to a method and apparatus for recording a vehicle data set based on a potential impending vehicle incident.

Insurance and other safety related costs are among the largest costs paid by commercial vehicle fleet operators. Commercial fleet operators have an interest in understanding vehicle incidents such as vehicle accidents and near-misses of vehicle accidents, and unsafe driver behavior leading up to such incidents, which can provide an opportunity to take appropriate action for poorly performing drivers. However, recording a constant video feed of the outside of a vehicle can provide for countless hours of footage that must be reviewed in order to determine actual relevant portions of interest, further increasing costs and reducing effectiveness of reviewers.

SUMMARY

A recording system for a vehicle according to an example of the present disclosure includes a plurality of proximity sensors configured to obtain data indicative of a distance between a vehicle and external objects and at least one vehicle operation sensor configured to obtain data indicative of how a driver is operating the vehicle. A controller is configured to obtain input data for a current monitoring period that includes data from the plurality of proximity sensors and the at least one vehicle operation sensor, and utilize a predictive engine to determine whether the input data fulfills a criteria set corresponding to a potential impending vehicle incident. Based on the input data fulfilling the criteria set, the controller is configured to commence saving the input data from the current monitoring period and subsequent monitoring periods in a data set. Based on the input data not fulfilling the criteria set, the controller is configured to delete the input data for the current monitoring period.

In a further embodiment of any of the foregoing embodiments, the plurality of proximity sensors includes an external vehicle camera operable to record images of an environment outside of the vehicle, and as part of commencing saving of the input data the controller is configured to commence saving images from the external vehicle camera in the data set.

In a further embodiment of any of the foregoing embodiments, the controller is configured to complete the data set and cease adding input to the data set based on occurrence of an exit event.

In a further embodiment of any of the foregoing embodiments, the criteria set that is fulfilled is based on one or more first parameters, and the exit event is based on one or more second parameters that differ from the one or more first parameters.

In a further embodiment of any of the foregoing embodiments, the predefined criteria set indicates one or more of an impending collision or near-miss of a collision between the vehicle and a particular one of the external objects, and an impending rollover or near-miss of a rollover of the vehicle.

In a further embodiment of any of the foregoing embodiments, the exit event comprises one or more of passage of predefined amount of time, and a distance between the vehicle and the particular one of the external objects exceeding a predefined distance threshold.

In a further embodiment of any of the foregoing embodiments, the controller is configured to provide the data set to a post-processing engine after the exit event, and utilize the post-processing engine to determine whether the potential impending vehicle incident occurred.

In a further embodiment of any of the foregoing embodiments, the controller is configured to delete the data set based on the post-processing engine indicating the potential impending vehicle incident did not occur.

In a further embodiment of any of the foregoing embodiments, the controller is configured to, based on the post-processing engine indicating the potential impending vehicle incident occurred, transmit the data set to a reviewer for confirmation of the vehicle incident. Based on the reviewer confirming the vehicle incident occurred, the controller is configured to preserve the data set in a data set repository for future reference. Based on the reviewer indicating the vehicle incident did not occur, the controller is configured to delete the data set and utilize the data set as training data for the neural network.

In a further embodiment of any of the foregoing embodiments, the driver monitoring system includes a controller area network (CAN) bus, wherein the controller is configured to communicate with the plurality of proximity sensors, the at least one vehicle operation sensor, or both, through the CAN bus.

In a further embodiment of any of the foregoing embodiments, the at least one vehicle operation sensor includes one or more of an acceleration sensor, a steering angle sensor, a braking sensor, and a gyroscope.

In a further embodiment of any of the foregoing embodiments, the plurality of proximity sensors has one or more of the following types of sensors: Lidar, Radar, ultrasonic, and camera.

In a further embodiment of any of the foregoing embodiments, the controller is configured to commence saving of the input data from the current monitoring period and subsequent monitoring periods in a data set based on a request from an occupant of the vehicle.

A method of recording data for a vehicle according to an example of the present disclosure includes obtaining input data for a current monitoring period, the input data including data from a plurality of proximity sensors that is indicative of a distance between a vehicle and external objects, and data from at least one vehicle operation sensor that is indicative of how a driver is operating the vehicle. A predictive engine is utilized to determine whether the input data fulfills a criteria set corresponding to a potential impending vehicle incident. Based on the input data fulfilling the criteria set, saving of the input data from the current monitoring period and subsequent monitoring periods in a data set is commenced. Based on the input data not fulfilling the criteria set, the input data for the current monitoring period is deleted.

In a further embodiment of any of the foregoing embodiments, commencing saving of the input data includes commencing saving images of an environment outside of the vehicle from an external vehicle camera.

A further embodiment of any of the foregoing embodiments includes completing the data set and ceasing adding input data to the data set based on occurrence of an exit event.

In a further embodiment of any of the foregoing embodiments, the criteria set that is fulfilled is based on one or more first parameters, and the exit event is based on one or more second parameters that differ from the one or more first parameters.

In a further embodiment of any of the foregoing embodiments, the predefined criteria set indicates one or more of an impending collision or near-miss of a collision between the vehicle and a particular one of the external objects, and an impending rollover or near-miss of a rollover of the vehicle.

In a further embodiment of any of the foregoing embodiments, the exit event comprises one or more of passage of predefined amount of time, and a distance between the vehicle and the particular one of the external objects exceeding a predefined distance threshold.

In a further embodiment of any of the foregoing embodiments, the method includes providing the data set to a post-processing engine after the exit event, and utilizing the post-processing engine to determine whether the potential impending vehicle incident occurred.

In a further embodiment of any of the foregoing embodiments, the method includes deleting the data set based on an indication from the post-processing engine indicating the potential impending vehicle incident did not occur.

In a further embodiment of any of the foregoing embodiments, the method includes utilizing the data set as training data for the neural network based on the post-processing engine indicating the potential impending vehicle incident occurred.

In a further embodiment of any of the foregoing embodiments, the method includes, based on the post-processing engine indicating the potential impending vehicle incident occurred, transmitting the data set to a reviewer for vehicle incident confirmation, preserving the data set in a data set repository for future reference based on the reviewer indicating confirming the vehicle incident occurred, and deleting the data set based on the reviewer indicating the vehicle incident did not occur.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
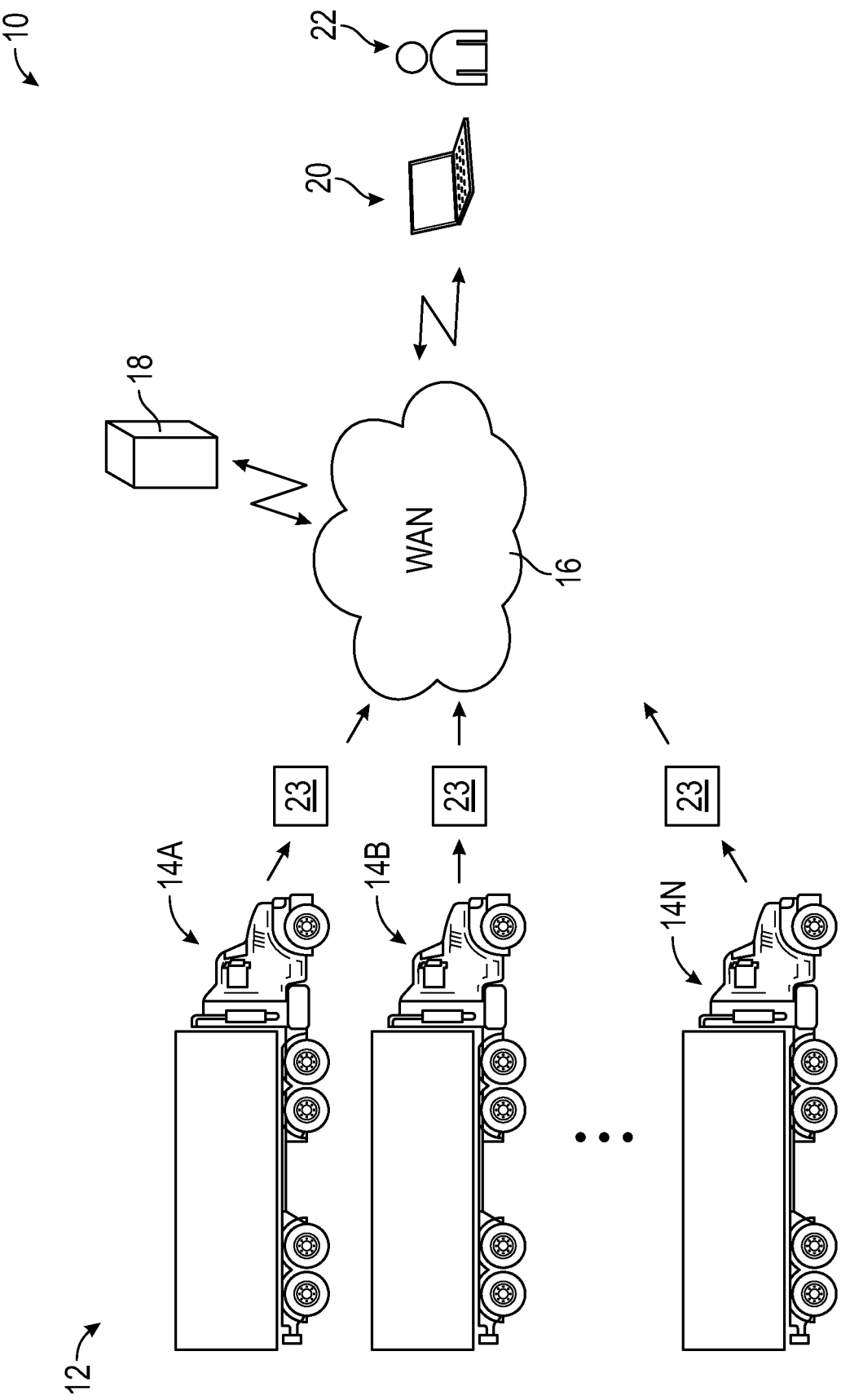
FIG. 1 schematically illustrates an example fleet management system.

FIG. 1 schematically illustrates an example fleet management system 10 that includes a fleet 12 of vehicles 14A-N operable to communicate with a fleet manager 22 through a wide area network ("WAN") 16, such as the Internet. The vehicles 14 are operable to record and transmit data sets 23 that include data indicative of a distance between the vehicles 14 and external objects, and include data indicative of how drivers are operating the vehicles 14. The vehicles 14A-N are operable to communicate with a fleet manager 22 by transmitting the data sets 23 to the fleet manager's computer 20 and/or by transmitting the data sets 23 to a fleet management server 18. In the example of FIG. 1, the vehicles 14 are trucks, but it is understood that other commercial vehicles could be used, such as delivery vans and the like.

Figure 2:
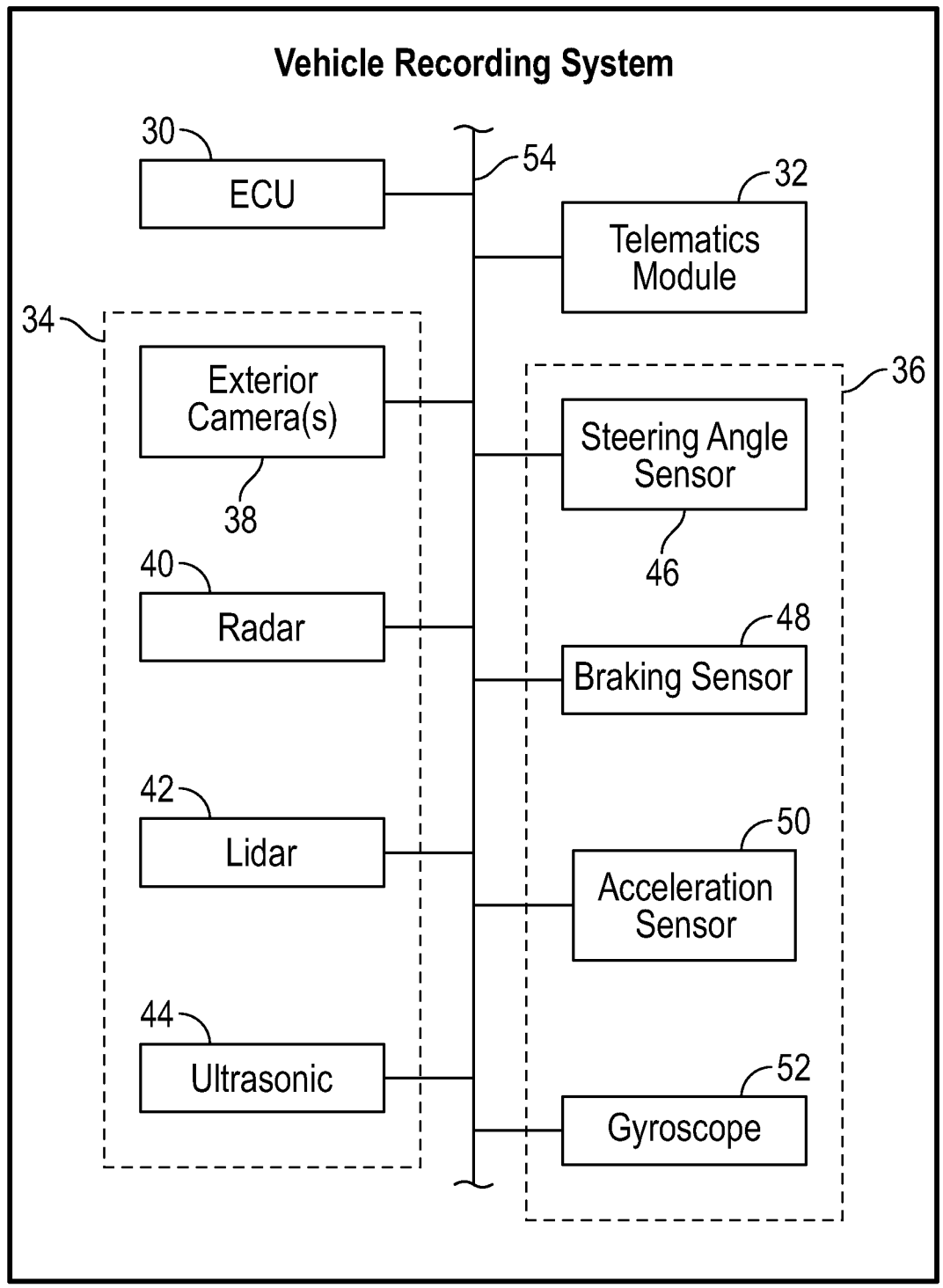
FIG. 2 schematically illustrates components of an example recording system for a vehicle.

FIG. 2 schematically illustrates components of an example vehicle recording system 24 provided in each vehicle 14. In the example of FIG. 2, the vehicle recording system 24 includes an electronic control unit (ECU) 30 which is operably connected to a telematics module 32, a plurality of proximity sensors 34, and a plurality of vehicle operation sensors 36.

The telematics module 32 includes a wireless transceiver operable to communicate and transmit the data sets 23 through the WAN 16. In one example, the telematics module 32 is configured to use a predefined protocol standard such as one or more of the 802.11 standards and/or one or more cellular standards (e.g., GSM, CDMA, LTE, etc.).

The proximity sensors 34 are configured to record data about an external environment of the vehicle 14 that is indicative of a distance between the vehicle 14 and external objects, such as other vehicles, pedestrians, cyclists, etc. This data can be used to infer a relative speed of the vehicle 14 and the external objects. In the example of FIG. 2, the proximity sensors 34 include a plurality of exterior cameras 38 operable to record images of an environment outside of the vehicle, radio detection and ranging ("Radar") sensors 40, light detection and ranging ("Lidar") sensors 42, and ultrasonic sensors 44. The ECU 30 is operable to perform object detection based on the data received from the proximity sensors 34, in order to determine how close the vehicle 14 is to surrounding objects and/or how fast the vehicle 14 is approaching or traveling away from the detected objects.

The plurality of vehicle operation sensors 36 are operable to record data indicative of how a driver is operating the vehicle 14. In the example of FIG. 2, the vehicle operation sensors 36 include a steering angle sensor 46, a braking sensor 48, an acceleration sensor 50, and a gyroscope 52. The steering angle sensor 46 is configured to detect anomalous steering events, such as a rapid steering wheel angle change that could be indicative of swerving. The braking sensor 48 is operable to detect control signals transmitted to a vehicle braking system. The acceleration sensor 50 is operable to detect changes in vehicle 14 acceleration, such as rapid acceleration and/or rapid deceleration (e.g., hard braking events) and is also operable to detect a vehicle 14 velocity. In one example, the acceleration sensor 50 includes, or is in communication with, a speedometer (not shown) of the vehicle 14. The gyroscope 52 is operable to detect vehicle tilting, such as around hard and/or fast turns.

In the example of FIG. 2, the ECU 30 is operably connected to the components 32-52 through a vehicle data bus 54, which may be a controller area network ("CAN") bus, for example. Of course, FIG. 2 is only an example, and it is understood that the ECU could connect to certain ones of the components 32-52 through other connections besides the vehicle data bus 54, and it is also understood that other quantities of proximity sensors 34 and vehicle operation sensors 36 could be used (e.g., omitting ultrasonic sensors 44 and/or gyroscope 52).

The ECU 30 is operable to detect objects outside the vehicle 14 and determine a relative speed at which the vehicle 14 is approaching such objects based on data from the proximity sensors 34, optionally also in conjunction with data from the vehicle operation sensors 36. For example, the ECU 30 could predict potential impending vehicle incidents (e.g., vehicle accidents, such as collisions and rollovers, and near-misses of such accidents) based on closing speed between the vehicle 14 and external object and closing distance between the vehicle 14 and the external object.

Figure 3:
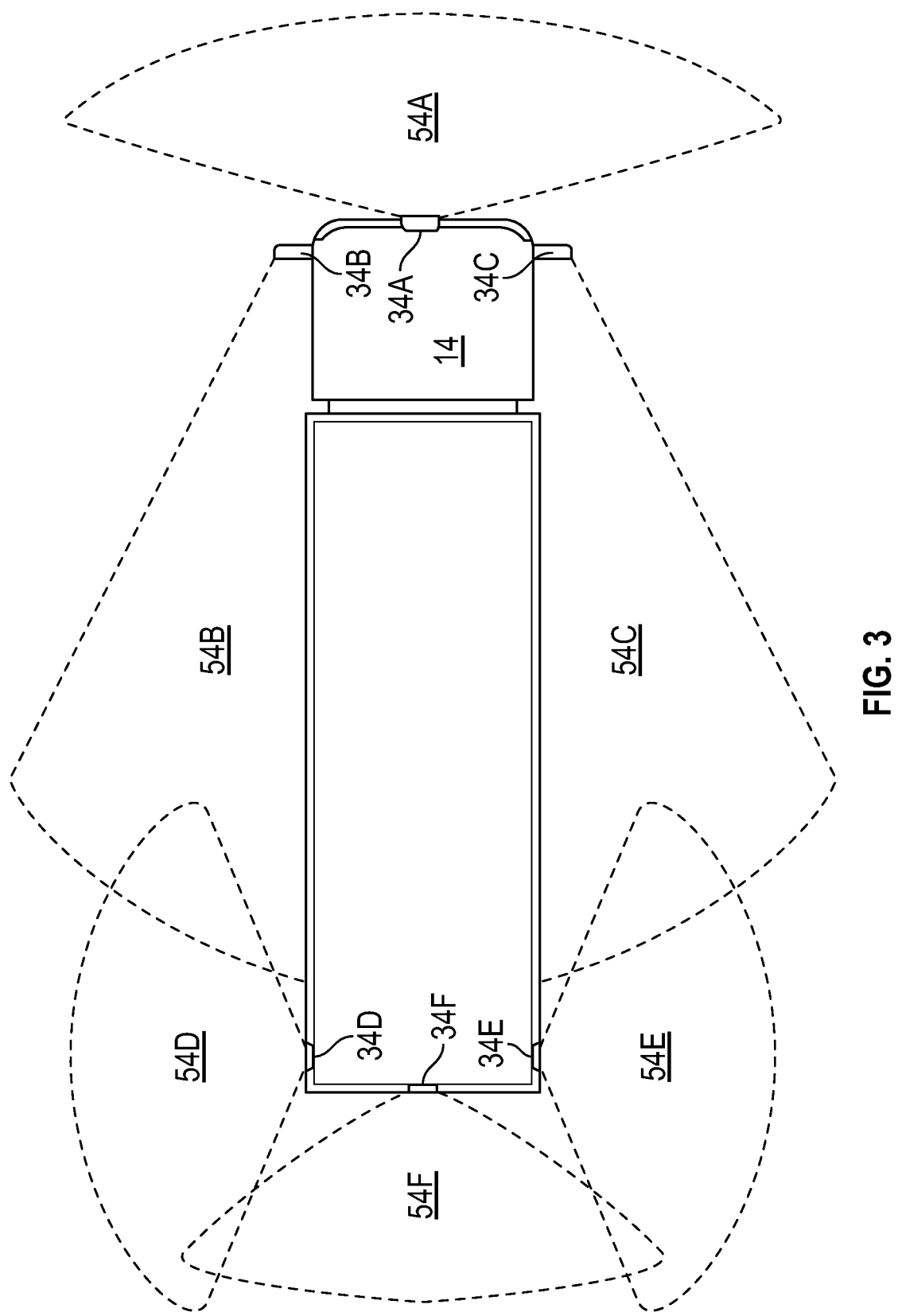
FIG. 3 schematically illustrates example sensor locations for a vehicle.

FIG. 3 schematically illustrates an example vehicle 14 and example locations for proximity sensors 34A-F, such as exterior cameras 38. Each proximity sensor 34A-F has an associated detection range schematically shown as 54A-F in FIG. 3. As shown, detection range 54D overlaps detection ranges 54B and 54F, and detection range 54E overlaps detection ranges 54C and 54F. Using the example of exterior camera proximity sensors 38, the proximity sensors 34A-F could be used for video capture of an environment surrounding the vehicle 14 leading up to a potential impending vehicle incident. Of course, the proximity sensor locations shown in FIG. 3 are only examples, and it is understood that other sensor locations could be used. The sensor locations may be defined in conjunction with Advanced Driver Assistance Systems (ADAS) requirements, or even autonomous vehicle requirements, and in some instances could be used by both systems. In one example, the sensors 34B-C are part of the MIRROREYE camera monitor system from Stoneridge, Inc.

Figure 4:
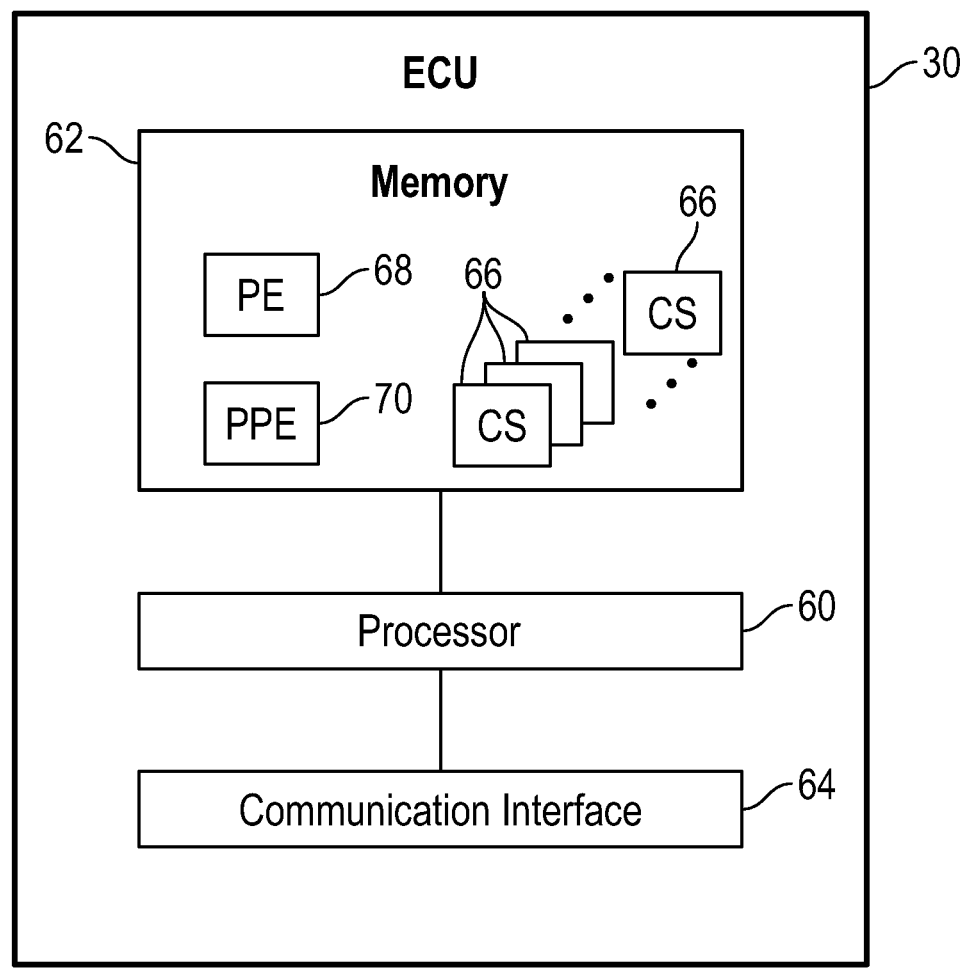
FIG. 4 schematically illustrates an electronic controller that can be used in the recording system of FIG. 2.

FIG. 4 schematically illustrates an example implementation of the ECU 30. As shown in FIG. 4, the ECU 30 includes a processor 60 operatively connected to memory 62 and a communication interface 64. The processor 60 includes one or more processing circuits, such as microprocessors, microcontrollers, application specific integrated circuits (ASICs), or the like. The communication interface 64 provides for communication between the ECU 30 and other components (e.g., a wired connection to the vehicle data bus 54).

The memory 62 may include one or several types of memory such as read-only memory (ROM), random-access memory, cache memory, flash memory devices, optical storage devices, etc. In the example of FIG. 4, the memory 62 stores a plurality of criteria sets 66, a predictive engine 68, and a post-processing engine 70.

Each of the criteria sets 66 describes the conditions corresponding to a potential impending vehicle incident, such as a potential vehicle 14 accident (e.g., collision or rollover) or near-miss of a vehicle accident. A potential collision for the vehicle 14 could be with another vehicle, or with a non-vehicle object (e.g., a tree, building, pedestrian, etc.). The criteria sets 66 can include scenarios for different types of accidents and accident near misses, such as front collisions, rear collisions and/or side collisions.

One criteria set 66 could include a potential impending vehicle incident based on a nearby vehicle tailgating the vehicle 14 within a predefined distance, and the vehicle 14 experiencing a hard braking corresponding to a predefined amount of deceleration within a predefined time window, thereby increasing the likelihood of a rear collision with the nearby vehicle.

In another example criteria set 66, if the vehicle 14 is 30 feet away from an object (e.g., another vehicle) but is only approaching the object at a relative speed of 5 miles per hour, that does not correspond to a potential impending vehicle incident. However, if the vehicle 14 is 20 feet away from the object and is either accelerating towards the object or is approaching the object at a speed that exceeds a predefined threshold, that does correspond to a potential impending vehicle incident. As used herein, "approaching the object" refers to relative movement of the vehicle 14 and object (e.g., both vehicle 14 and object moving towards each other, or one of the vehicle 14 and object being fixed and the other of the vehicle 14 and object approaching the fixed one).

In another example criteria set 66, which relates to vehicle rollover, the potential impending vehicle incident corresponds to the gyroscope 52 indicating a vehicle tilt angle above a predefined threshold in conjunction with the acceleration sensor 50 indicating a vehicle 14 velocity beyond a predefined threshold and the steering angle sensor 46 indicating a steering wheel angle beyond a predefined threshold.

In another example criteria set 66, the potential impending vehicle incident corresponds to the following three events occurring in conjunction with each other: (1) vehicle 14 detects brake lights of a vehicle it is following through a forward-facing camera, (2) a sensor of the vehicle 14, such as the radar 40, indicates a distance between the two vehicles is below a "caution" distance threshold, and (3) the ECU 30 determines that a relative speed between the vehicles is above a "caution" speed threshold.

In another example criteria set 66, the potential impending vehicle incident corresponds to rapid movement of a nearby vehicle that is within a predefined distance of the vehicle 14, with the "rapid movement" corresponding to the nearby vehicle weaving across lanes, as detected by rapid changes in direction of the nearby vehicle. In one example, the "rapid changes" are determined based on distance fluctuations between the vehicle 14 and the nearby vehicle. Optionally, the criteria set 66 could also include a relative speed between the vehicles exceeding a speed threshold.

The predictive engine 68 receives input data from the proximity sensors 34 and vehicle operation sensors 36, and determines whether the input data for a given monitoring period fulfills any of the criteria sets 66. If the ECU 30 detects that the data for a given monitoring period does not meet any of the criteria sets 66, the ECU 30 may discard the data. However, if the ECU 30 detects that the data for a given monitoring period does fulfill any of the criteria sets 66, indicating that a vehicle incident may be impending, the ECU 30 is operable to commence saving the input data from that current monitoring period and subsequent monitoring periods in a data set for further analysis (e.g., by the fleet manager 22). In one example, the predictive engine 68 includes a neural network and utilizes the neural network for the determination of whether a vehicle incident is impending. In another example, the predictive engine 68 uses predefined logic, such as if-then statements and/or ladder logic, without utilizing a neural network to make its determination.

The post-processing engine 70 receives a completed data set and analyzes the data set to determine if the impending vehicle incident occurred. In one example, the post-processing engine 70 utilizes its own neural network that is separate from the predictive engine 68 for its analysis. In one example, the post-processing engine 70 uses predefined logic, such as if-then statements and/or ladder logic, without utilizing a neural network to make its determination.

For example, the post-processing engine 70 may base its detection in part on whether the vehicle 14 pulled over within a predefined time period after the impending vehicle incident was predicted to occur (as such pulling over may happen after a collision).

The post-processing engine 70 may base its determination on whether the distance between the vehicle 14 and an external object it was predicted to collide with fell below a predefined and also whether that distance subsequently grew to beyond a safe following distance threshold. For example, if the vehicle 14 was 20 feet away from an object and was approaching the object at a relative speed of 70 miles per hour but the distance never fell below 5 feet and the distance then started growing beyond 100 feet, the post-processing engine 70 may determine that neither an accident nor a near-miss accident occurred. In one example, the thresholds used for what constitutes a near-miss could be customizable according to fleet manager preferences.

As another example, if the gyroscope 52 indicates that the vehicle 14 was tilting beyond a predefined tilt angle but then resumed being upright, the post-processing engine 70 may determine that the vehicle did not roll over. Whether this constitutes a near-miss could be determined based on preferences of the fleet manager, as different fleets may have different tolerance levels for how near a near-miss of an accident can be.

Based on a set of inputs from the vehicle proximity sensors 34 and vehicle operation sensors 36, the post-processing engine 70 determines whether an incident occurred which is of interest and for which the video should be saved/transmitted. For example, a nearby vehicle weaving in and out of traffic may be a potential issue and trigger recording. After the vehicle recording system 24 determines that an exit condition has occurred indicating the incident has passed, for example the nearby vehicle weaving in and out of traffic has passed the vehicle 14 and is no longer "close" to the vehicle 14, the post-processing engine 70 will compare the inputs against a set of rules or a neural network to determine if the video actually captures an incident of interest (e.g., an accident or near-miss). If the post-processing engine 70 determines that an incident of interest was captured on video, the post-processing engine 70 can trigger the saving or transmission (or both) of the video, including if possible the reasoning behind the decision of why the incident is one of interest.

Figure 5:
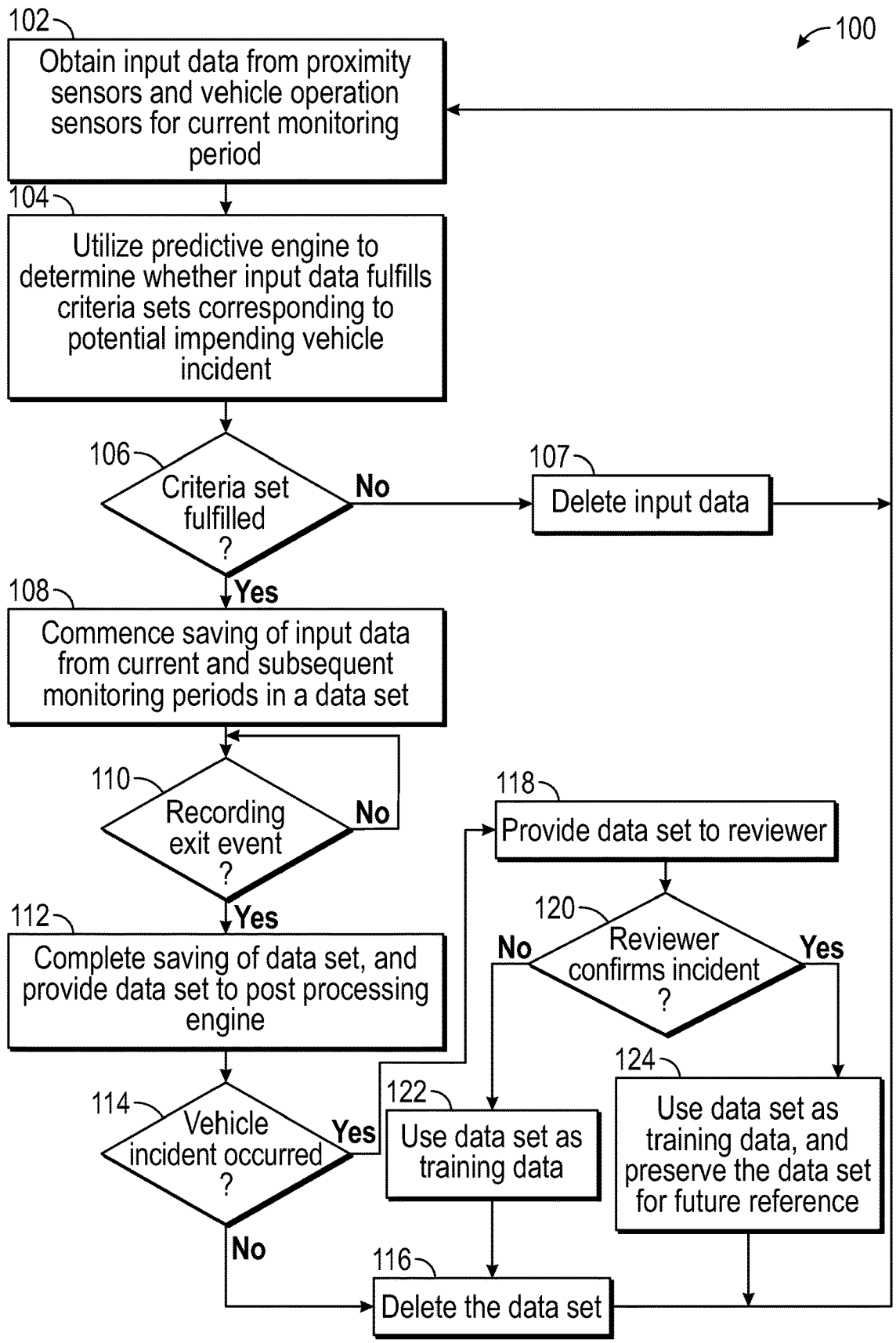
FIG. 5 is a flow chart of an example method of recording data for a vehicle.

FIG. 5 is a flowchart of an example method 100 of using the vehicle recording system 24 to record data for the vehicle 14. The ECU 30 obtains input data from the proximity sensors 34 and the vehicle operation sensors 36 for a current monitoring period (step 102). In one example, the current monitoring period refers to a current sampling period, on the order of several seconds or less. The ECU 30 utilizes the predictive engine 68 to determine whether the input data fulfills one of the criteria sets 66 corresponding to potential impending vehicle incidents (step 104). In one example, step 104 includes the predictive engine 68 utilizing predefined logic or optional neural network described above. If no criteria set 66 is fulfilled (a "no" to step 106) the ECU 30 deletes the input data for the current monitoring period (step 107), and continues to monitor input data for subsequent monitoring periods (step 102).

However, if one of the criteria sets 66 is fulfilled (a "yes" to step 106), which constitutes an "entry condition," the ECU 30 commences saving the input data from the current monitoring period and for subsequent monitoring periods in a data set 23 (step 108). "Commencing saving" refers to the ECU 30 taking data from the sensors 34, 36 from short term storage (e.g., an input buffer, which may include RAM memory), and saving the data for longer term storage (e.g., a non-RAM portion of the memory 62), where it is preserved for transmission and/or eventual download by a reviewer (e.g., fleet manager 22). The data that is preserved includes the input data that has already been recorded and used to detect a potential impending vehicle incident and may optionally also include additional incoming data from the sensors 34, 36 (e.g., until an exit event is detected). Thus, the triggering of the commencement of saving sensor data in step 108 can occur before the entire data set is obtained.

In one example, the short term storage is automatically discarded and/or overwritten by new incoming sensor data (e.g., in a rolling buffer), whereas the longer term storage is not automatically discarded and/or overwritten by new incoming sensor data (e.g., until it has been transmitted and/or downloaded).

The ECU 30 analyzes the input data currently in the data set 23 to determine whether an "exit event" has occurred indicating that the event of interest has passed (step 110). Some example exit events could include passage of a predefined amount of time, the detection of a collision, or a detection that two objects believed to be about to collide are now a predefined distance apart from each other. Other example exit events could include the vehicle 14 turning away from the object it was predicted to have an incident with onto a different road (e.g., at a corner), or taking an exit ramp, thereby ending the interaction with the nearby object. Thus, the criteria sets 66 include one or more first parameters (e.g., activated brake lights of other vehicles, vehicle tilt angle, vehicle speed), and the exit event is based on one or more second parameters (e.g., passage of time, objects diverging) that in some examples differ from the one or more first parameters.

If no exit event is detected (a "no" to step 110), the ECU 30 continues gathering data and analyzing the growing data set 23 for the occurrence of an exit event.

If an exit event is detected (a "yes" to step 110), the 30 ECU ceases adding new data to the data set 23, completes the saving of the data set 23, and provides the data set 23 to the post-processing engine 70 (step 112). The post-processing engine 70 analyzes the data set 23 to determine whether the vehicle incident actually occurred (step 114). In one example, step 114 includes the post-processing engine 70 utilizing the predefined logic or optional neural network descried above. If the post-processing engine 70 determines that no incident has occurred (a "no" to step 114), the ECU 30 deletes the data set 23 (step 116).

However, if the post-processing engine 70 determines that the vehicle incident did occur (a "yes" to step 114), the ECU 30 transmits the data set 23 to a reviewer, such as the fleet manager 22 (step 118). The reviewer analyzes the data set 23 to determine whether the incident occurred (step 120). One example, this includes the reviewer only analyzing an image portion of the data set 23 (e.g. a series of still photographs or a video feed).

If the reviewer indicates that the vehicle incident did not occur (a "no" to step 120), the data set 23 is used as training data for the neural network of the predictive engine 68 and/or for the neural network of post-processing engine 70 (step 122), and the data set 23 is deleted (step 116). In one example, the neural network of the predictive engine 68 and/or post-processing engine 70 can be trained/updated over the air by the reviewer (e.g., the fleet manager 22) to reflect the latest training data.

If the reviewer does confirm occurrence of the incident (a "yes" to step 120), the data set 23 is preserved for future reference and is optionally also used as training data for the neural network of the predictive engine 68 and/or post-processing engine 70 (step 124) (e.g., in an over the air manner as described above). In one example, step 124 includes preserving the data set 23 in a repository of vehicle incident data sets in the fleet management server 18, which can be used for driver instruction, and/or evidence in the event the data set 23 is needed as evidence in relation to a vehicle incident, such as in determining who is at fault in the vehicle incident.

By detecting the most relevant times during which vehicle proximity sensor 34 and vehicle operation sensor 36 data is useful, the ECU 30 is operable to substantially reduce the time reviewers spend reviewing vehicle data.

An optional feature that may be provided is one in which occupants (e.g., drivers) of the vehicles 14 can trigger the recording of a data set based on their desires by requesting that the ECU 30 commence saving a data set of data from the sensors 34, 36. This could provide for recording of a noteworthy event not corresponding to one of the criteria sets 66 (e.g., a vehicle accident that involves only third party vehicles and not the vehicles 14) and/or could provide for recording of events (e.g., someone driving erratically) that although would eventually fulfill one or more of the criteria sets 66, has not yet fulfilled any of the criteria sets 66. The occupant-requested recording could be terminated by a subsequent occupant request and/or by the detection of an exit event (see step 110).

While prior art systems have proposed utilizing a rolling video buffer of a limited duration, this provides for a rigid maximum recording length. In one example the recording system 24 can facilitate recording data sets that include video feeds that have an arbitrary time span unconstrained by such a rolling buffer. Additionally, the vehicle recording system 24 is highly customizable depending on the requirements of the fleet operator. For example, certain fleets 12 may utilize differing criteria for what constitutes an impending vehicle incident. Also, as another example, certain fleets 12 may wish to omit the post-processing engine 70 and proceed directly to transmitting the data set 23 to a reviewer.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A recording system for a vehicle, comprising:
   a plurality of proximity sensors configured to obtain data indicative of a distance between a vehicle and external objects;
   at least one vehicle operation sensor configured to obtain data indicative of how a driver is operating the vehicle; and
   a controller configured to:
      obtain input data from random access memory (RAM) for a current monitoring period that includes data from the plurality of proximity sensors and the at least one vehicle operation sensor;
      utilize a predictive engine to determine whether the input data fulfills any of a plurality of a criteria sets, each corresponding to a respective potential impending vehicle incident;
      based on the predictive engine indicating that the input data fulfills one of the criteria sets, commence saving of the input data from the current monitoring period and subsequent monitoring periods in a data set in in non-RAM memory; and
      based on the input data not fulfilling any of the criteria sets, deleting the input data for the current monitoring period from the RAM memory;
      complete and cease saving input data to the data set in the non-RAM memory based on occurrence of an exit event corresponding to said one of the criteria sets;
   wherein:
      one of the respective potential impending vehicle incidents is an impending vehicle rollover, and the criteria set for the impending vehicle rollover includes a gyroscope vehicle operation sensor indicating a vehicle tilt angle above a predefined threshold; or
      one of the respective potential impending vehicles incidents is an impending vehicle collision with a particular one of the external objects, and the exit event for the impending vehicle collision includes at least one of a distance between the vehicle and the particular one of the external objects exceeding a predefined distance threshold, the vehicle turning away from the particular one of the external objects, and the vehicle taking an exit ramp.

2. The recording system of claim 1, wherein:
   the plurality of proximity sensors include an external vehicle camera operable to record images of an environment outside of the vehicle; and
   as part of commencing saving of the input data in the non-RAM memory, the controller is configured to commence saving images from the external vehicle camera in the data set in the non-RAM memory.

3. The recording system of claim 1, wherein the criteria set that is fulfilled is based on one or more first parameters, and the exit event is based on one or more second parameters that differ from the one or more first parameters.

4. The recording system of claim 1, wherein the controller is configured to:
   provide the data set to a post-processing engine after the exit event; and
   utilize the post-processing engine to determine whether the potential impending vehicle incident occurred;
   delete the data set from the non-RAM memory based on the post-processing engine indicating the potential impending vehicle incident did not occur.

5. The recording system of claim 4, wherein the controller is configured to, based on the post-processing engine indicating the potential impending vehicle incident occurred:
   transmit the data set to a reviewer for confirmation of the vehicle incident;
   based on the reviewer confirming the vehicle incident occurred, preserve the data set in a data set repository in the non-RAM memory for future reference; and
   based on the reviewer indicating the vehicle incident did not occur, utilize the data set as training data for a neural network of the predictive engine.

6. The driver monitoring system of claim 1, comprising a controller area network (CAN) bus, wherein the controller is configured to communicate with the plurality of proximity sensors, the at least one vehicle operation sensor, or both, through the CAN bus.

7. The driver monitoring system of claim 1, wherein the at least one vehicle operation sensor includes one or more of an acceleration sensor, a steering angle sensor, a braking sensor, and a gyroscope.

8. The recording system of claim 1, wherein the plurality of proximity sensors include one or more of the following types of sensors: Lidar, Rada, ultrasonic, and camera.

9. The recording system of claim 1, wherein the controller is configured to:
commence saving of the input data from the current monitoring period and subsequent monitoring periods in a data set in the non-RAM memory based on a request from an occupant of the vehicle.

10. A method of recording data for a vehicle, comprising:
obtaining input data from random access memory (RAM) for a current monitoring period, the input data including data from a plurality of proximity sensors that is indicative of a distance between a vehicle and external objects, and data from at least one vehicle operation sensor that is indicative of how a driver is operating the vehicle;
utilizing a predictive engine to determine whether the input data fulfills any of a plurality of criteria sets, each corresponding to a potential impending vehicle incident;
based on the predictive engine indicating that the input data fulfills one of the criteria sets, commencing saving of the input data from the current monitoring period and subsequent monitoring periods in a data set in non-RAM memory; and
based on the input data not fulfilling any of the criteria sets, deleting the input data for the current monitoring period from the RAM memory;
completing and ceasing saving input data to the data set in the non-RAM memory based on occurrence of an exit event corresponding to said one of the criteria sets;
wherein:
the potential impending vehicle incident is an impending vehicle rollover, and the criteria set for the impending vehicle rollover includes a gyroscope vehicle operation sensor indicating a vehicle tilt angle above a predefined threshold; or
one of the respective potential impending vehicle incidents is an impending vehicle collision with a particular one of the external objects, and the exit event for the impending vehicle collision includes at least one of a distance between the vehicle and the particular one of the external objects exceeding a predefined distance threshold, the vehicle turning away from the particular one of the external objects, and the vehicle taking an exit ramp.

11. The method of claim 10, wherein the criteria set that is fulfilled is based on one or more first parameters, and the exit event is based on one or more second parameters that differ from the one or more first parameters.

12. The method of claim 11, comprising:
providing the data set to a post-processing engine after the exit event;
utilizing the post-processing engine to determine whether the potential impending vehicle incident occurred;
deleting the data set from the non-RAM memory based on an indication from the post-processing engine indicating the potential impending vehicle incident did not occur; and
utilizing the data set as training data for a neural network of the predictive engine based on the post-processing engine indicating the potential impending vehicle incident occurred.

13. The method of claim 12, comprising, based on the post-processing engine indicating the potential impending vehicle incident occurred:
transmitting the data set to a reviewer for vehicle incident confirmation;
preserving the data set in a data set repository in the non-RAM memory for future reference based on the reviewer confirming the vehicle incident occurred; and
deleting the data set from the non-RAM memory based on the reviewer indicating the vehicle incident did not occur.

14. The recording system of claim 1, wherein one of the respective potential impending vehicle incidents is an impending vehicle rollover, and the criteria set for the impending vehicle rollover includes a gyroscope vehicle operation sensor indicating a vehicle tilt angle above a predefined threshold.

15. The recording system of claim 14, wherein the criteria set for the impending vehicle rollover also includes an a velocity of the vehicle exceeding a predefined velocity threshold and a steering wheel angle of the vehicle exceeding a predefined steering wheel angle threshold.

16. The recording system of claim 1, wherein one of the respective potential impending vehicle incidents is an impending vehicle collision with a particular one of the external objects, and the exit event for the impending vehicle collision includes a distance between the vehicle and the particular one of the external objects exceeding a predefined distance threshold.

17. The recording system of claim 1, wherein one of the respective potential impending vehicle incidents is an impending vehicle collision with a particular one of the external objects, and the exit event for the impending vehicle collision includes the vehicle taking an exit ramp or turning away from the particular one of the external objects.

18. The recording system of claim 1, wherein one of the respective potential impending vehicle incidents is an impending vehicle collision with a particular one of the external objects, and the exit event for the impending vehicle collision includes the vehicle colliding with the particular one of the external objects.

19. The method of claim 10, wherein:
one of the respective potential impending vehicle incidents is an impending vehicle collision with a particular one of the external objects, and the exit event for the impending vehicle collision also includes at least one:
the vehicle taking an exit ramp;
the vehicle turning away from the particular one of the external objects; and
the vehicle colliding with the particular one of the external objects.

20. The method of claim 10, wherein one of the respective potential impending vehicle incidents is an impending vehicle rollover, and the criteria set for the impending vehicle rollover includes a gyroscope vehicle operation sensor indicating a vehicle tilt angle above a predefined threshold.

21. The method of claim 17, wherein the criteria set for the impending vehicle rollover also includes an a velocity of the vehicle exceeding a predefined velocity threshold and a steering wheel angle of the vehicle exceeding a predefined steering wheel angle threshold.

* * * * *